United States Patent
Minowa et al.

(10) Patent No.: US 6,216,082 B1
(45) Date of Patent: *Apr. 10, 2001

(54) METHOD AND APPARATUS FOR CONTROLLER POWER TRAIN OF MOTOR VEHICLE

(75) Inventors: Toshimichi Minowa, Mito; Hiroshi Kuroda, Hitachi; Satoru Kuragaki; Kenichirou Kurata, both of Hitachinaka; Tatsuya Ochi, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/294,312

(22) Filed: Apr. 20, 1999

Related U.S. Application Data

(63) Continuation of application No. 09/020,862, filed on Feb. 9, 1998, now Pat. No. 5,902,345, which is a continuation of application No. 08/654,971, filed on May 28, 1996, now Pat. No. 5,752,214.

(30) Foreign Application Priority Data

May 25, 1995 (JP) .................................................. 7-126204

(51) Int. Cl.[7] ................................. G06F 7/00; G06F 17/00
(52) U.S. Cl. .................................. 701/96; 701/70; 701/65; 701/111
(58) Field of Search ................................. 701/65, 70, 96, 701/83, 84, 90, 91, 111; 307/10.1; 123/478, 492, 493; 477/107, 54, 186; 340/436; 180/197

(56) References Cited

U.S. PATENT DOCUMENTS

| 4,023,641 | * | 5/1977 | Ganoung | 180/307 |
|---|---|---|---|---|
| 4,615,410 | * | 10/1986 | Hosaka | 701/84 |
| 4,682,667 | * | 7/1987 | Hosaka | 180/197 |
| 4,866,622 | * | 9/1989 | Dreher et al. | 701/102 |
| 5,018,408 | * | 5/1991 | Bota et al. | 477/61 |
| 5,041,978 | * | 8/1991 | Nakayama et al. | 701/83 |
| 5,125,292 | * | 6/1992 | Matsuoka et al. | 477/32 |
| 5,668,740 | * | 9/1997 | Wang et al. | 701/70 |
| 5,752,214 | * | 5/1998 | Minowa et al. | 701/111 |
| 5,902,345 | * | 5/1999 | Minowa et al. | 701/96 |

FOREIGN PATENT DOCUMENTS

| 42 01 142 A1 | 8/1992 | (DE) . |
|---|---|---|
| 43 38 244 A1 | 5/1994 | (DE) . |
| 43 42 257 A1 | 6/1994 | (DE) . |
| 44 03 351 A1 | 8/1994 | (DE) . |
| 44 23 966 A1 | 1/1995 | (DE) . |
| 43 35 979 A1 | 4/1995 | (DE) . |
| 7-47862 | 2/1995 | (JP) . |

* cited by examiner

Primary Examiner—William A. Cuchlinski, Jr.
Assistant Examiner—Gertrude Arthur
(74) Attorney, Agent, or Firm—Evenson, McKeown, Edwards & Lenahan, P.L.L.C.

(57) ABSTRACT

The vehicle power train control method and apparatus according to the invention secures both operability and safety by controlling an actual acceleration/deceleration to a target acceleration/deceleration requested by a driver under safe traveling condition, and changing the target acceleration/deceleration so as to take precedence for safe traveling if the driver encounters a dangerous traveling condition. According to the invention, acceleration/deceleration and speed of a motor vehicle are detected; a target acceleration/deceleration is determined; and a road condition such as a road gradient or presence or absence of a forward motor vehicle is detected to decide whether the road condition is dangerous. The target acceleration is changed if the condition is decided to be dangerous.

6 Claims, 13 Drawing Sheets

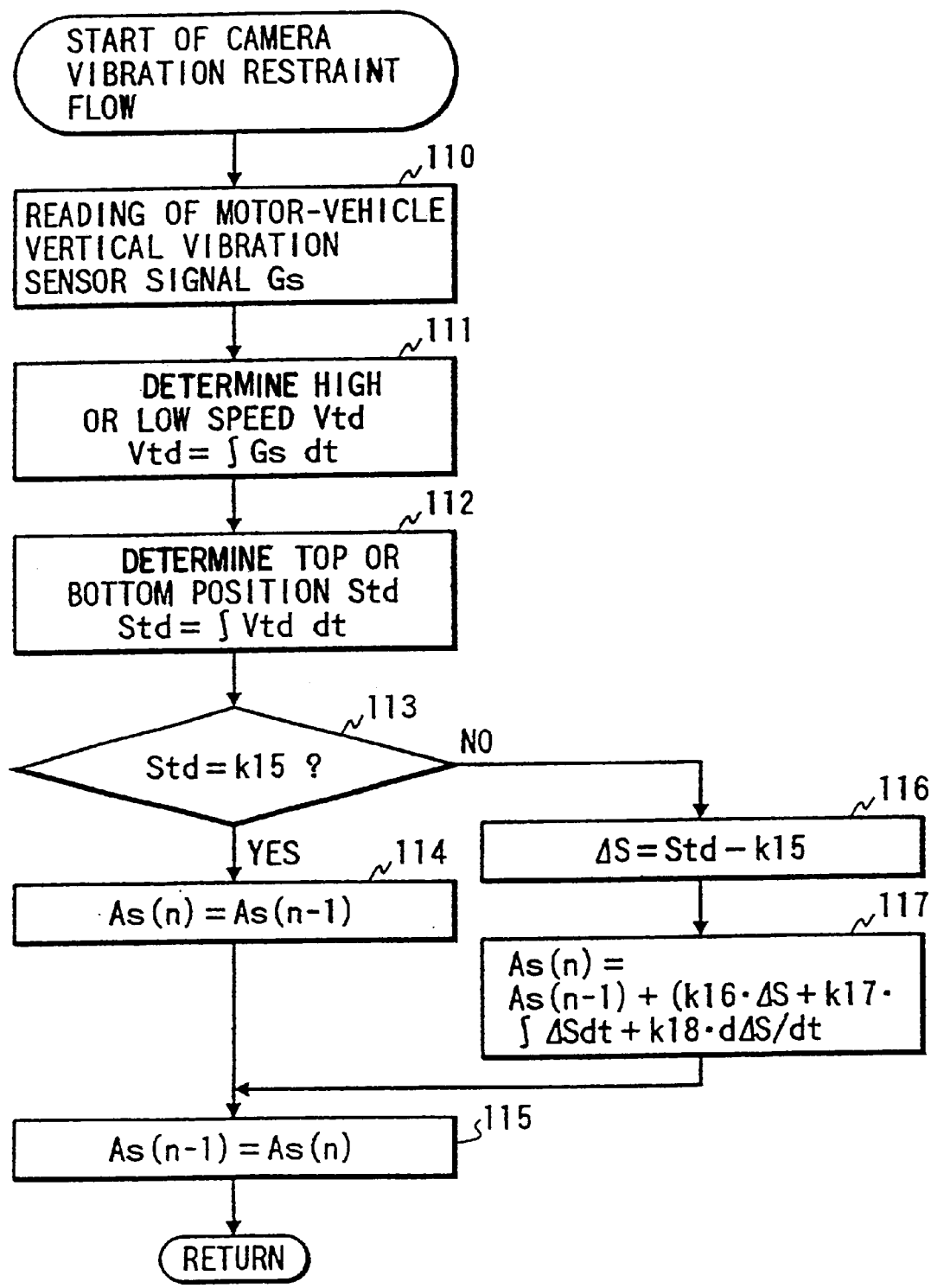

METHOD AND APPARATUS FOR CONTROLLER POWER TRAIN OF MOTOR VEHICLE

This application is a continuation of application Ser. No. 09/020,862 filed Feb. 9, 1998, now U.S. Pat. No. 5,902,345, which is a continuation of Ser. No. 08/645,971 filed May 28, 1996, now U.S. Pat. No. 5,752,214.

FIELD OF THE INVENTION

The present invention relates to a method and apparatus for controlling a motor vehicle, and in particular for efficiently controlling an engine power train comprising an engine and a transmission, in accordance with information such as a travelling condition, to realize an acceleration or deceleration requested by a driver.

BACKGROUND OF THE INVENTION

Japanese Patent Laid-Open No. 345541/1992 discloses a method which controls at least one of the engine torque adjustment means, transmission gear ratio adjustment means, and braking force adjustment means, so that a target acceleration/deceleration requested by a driver equals the actual motor vehicle acceleration/deceleration.

In a system for performing control in accordance with only a target acceleration/deceleration requested by a driver, such as in the above prior art, a traffic accident or speeding may occur if the driver erroneously recognizes a forward traveling condition, or responds too slowly to a traveling condition. Moreover, previous confirmation of a road gradient or a corner becomes insufficient, and it is difficult to secure a sufficient driving force before entering a slope or corner by controlling a transmission gear ratio.

SUMMARY OF THE INVENTION

It is an object of the present invention to provide a control method and apparatus capable of controlling an engine power train so that actual vehicle acceleration/deceleration equals a target acceleration/deceleration requested by a driver, under a normal safe traveling condition. It is another object of the invention to secure both operability and safety, giving preference, however, to safety by changing the target acceleration/deceleration if the driver encounters a dangerous traveling condition.

These and other objects and advantages are achieved by the control arrangement according to the invention, which comprises detectors for detecting acceleration/deceleration requested by a driver, as well as actual motor vehicle speed; a unit for setting a target acceleration/deceleration in accordance with the requested acceleration/deceleration detection and the motor vehicle speed; a unit for detecting a traveling road conditions, including an obstacle such as a forward motor vehicle; a dangerous traveling derision unit for deciding whether a traveling condition is dangerous, based on detected road conditions; and a unit for changing the set target value when dangerous traveling is determined to exist.

The acceleration/deceleration detector unit detects an accelerator by detecting a positive accelerator pedal depression by a driver, and detects deceleration by detecting a negative acceleration depression by the driver, so as to release the accelerator, and a brake pedal depression force. The vehicle speed detection unit uses a signal output from a rotation sensor on an output shaft or a wheel rotation shaft of a transmission to convert the signal value into a motor vehicle speed. The target acceleration/deceleration unit sets a motor-vehicle acceleration/deceleration requested by a driver in accordance with the results detected by the acceleration/deceleration detector unit and the motor vehicle speed detector unit. The road condition detection unit detects approaching motor vehicles and other obstacles, and a road-surface friction coefficient by means of a camera, radar, navigation map information, and other vehicle infrastructure equipment (hereinafter, "infra-equipment") directed to the road ahead. The dangerous traveling decision unit decides whether the present motor vehicle traveling falls into a dangerous traveling condition several seconds later (this value changes with the motor vehicle speed) in accordance with the results detected by the road condition detection unit and the motor vehicle speed detector unit. The target value change unit changes the set target acceleration/deceleration in response to a determination of dangerous travel by the dangerous traveling decision unit.

A target braking/driving torque operation unit transmits a target braking/driving torque to a wheel in accordance with the results obtained from road condition detection unit, target acceleration/deceleration unit, motor vehicle speed detector unit, and target value change unit. Moreover, in accordance with this result, a control input of the following control unit is operated. Control input operation means operates a final control input by using a motor vehicle speed, a sufficient driving torque corresponding to the motor vehicle speed, road gradient, target acceleration/deceleration, and target braking/driving torque and considering fuel consumption, and operability and safety intended by a driver. Controls such as engine torque control, the transmission gear ratio control, and braking force control adjust each power train control in accordance with the above determined and detected results.

As described above, the present invention makes it possible to secure both operability and safety because an actual acceleration/deceleration is controlled equal a requested acceleration/deceleration at the time of safe traveling; while safety-priority control is executed during a dangerous traveling condition.

Other objects, advantages and novel features of the present invention will become apparent from the following detailed description of the invention when considered in conjunction with the accompanying drawings.

BRIEF DESCRIPTION OF THE DRAWINGS

FIG. 15 is a flow chart of vibration control by a television camera.

DETAILED DESCRIPTION OF THE PREFERRED EMBODIMENTS

Preferred embodiments of the present invention are described below by referring to the accompanying drawings.

Figure 1:
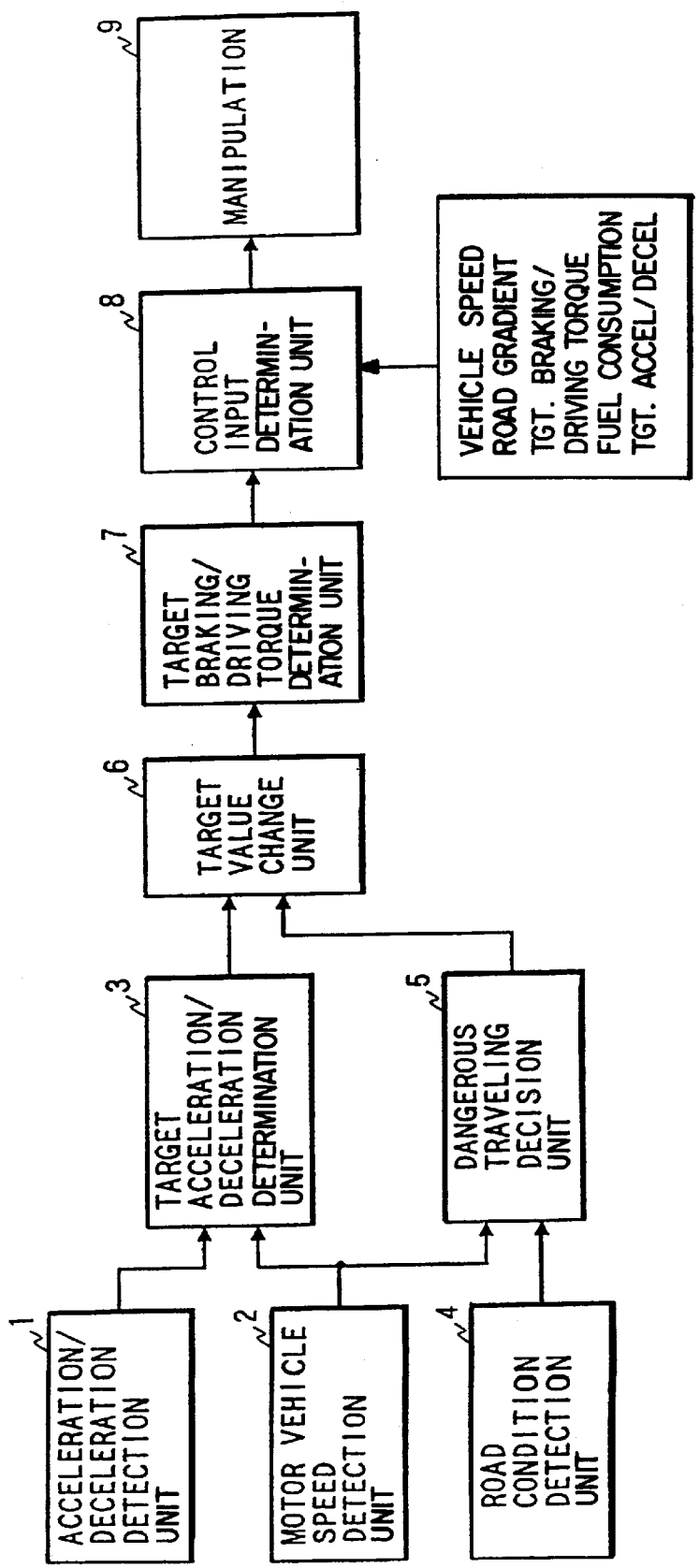
FIG. 1 is a block diagram of control by an embodiment of the present invention.

FIG. 1 is a block diagram of control by an embodiment of the present invention. Acceleration/deceleration detector unit 1 detects an acceleration from a positive depression of an acceleration pedal by the foot of a driver, and a deceleration from a negative depression of the accelerator pedal by the foot of the driver (that is, removal of the driver's foot from the accelerator pedal, so as to release the accelerator), and a brake pedal depression force. Motor vehicle speed detector unit 2 uses a signal output from a rotation sensor mounted on an output shaft or a wheel rotation shaft of a transmission to determine vehicle speed. Target acceleration/deceleration operation unit 3 sets a motor vehicle acceleration/deceleration requested by the driver in accordance with the results detected by the acceleration/deceleration detector unit 1 and the motor vehicle speed detector unit 2. Road conditions unit 4 detects approaching road conditions, such as a road curvature radius, road gradient, presence or absence of approaching motor vehicle and other obstacles, and a road-surface friction coefficient, by means such as a camera, radar, and navigation map information; it also detects items manipulated by the driver, such as a rain-drop sensor signal, headlight signal, and seat belt signal.

Dangerous traveling decision unit 5 decides whether the present motor vehicle traveling conditions fall within dangerous traveling criteria several seconds later (this value changes with motor vehicle speed) in accordance with the results detected by the road condition detection unit 4 and the motor vehicle speed detector unit 2.

The target value change unit 6 changes the target acceleration/deceleration value when traveling is determined to be dangerous by the dangerous traveling decision unit 5. Target braking/driving torque determination unit 7 then controls a target braking/driving torque to be transmitted to a wheel in accordance with the results obtained from road condition detection unit 4, target acceleration/deceleration determination unit 3, motor vehicle speed detector unit 2, and target value change unit 6. Moreover, in accordance with this result, a control input of the following manipulation unit 9 is determined. Control input determination unit 8 determines a control input based on motor vehicle speed, a sufficient driving torque corresponding to the motor vehicle speed, road gradient, target acceleration/deceleration, and target braking/driving torque, and considering a fuel consumption, and operability and safety intended by driver. In the manipulation unit 9, an engine torque manipulation unit, a transmission gear ratio manipulation unit on the transmission, and a braking force manipulation unit are determined in accordance with the above operated and detected results.

Figure 2:
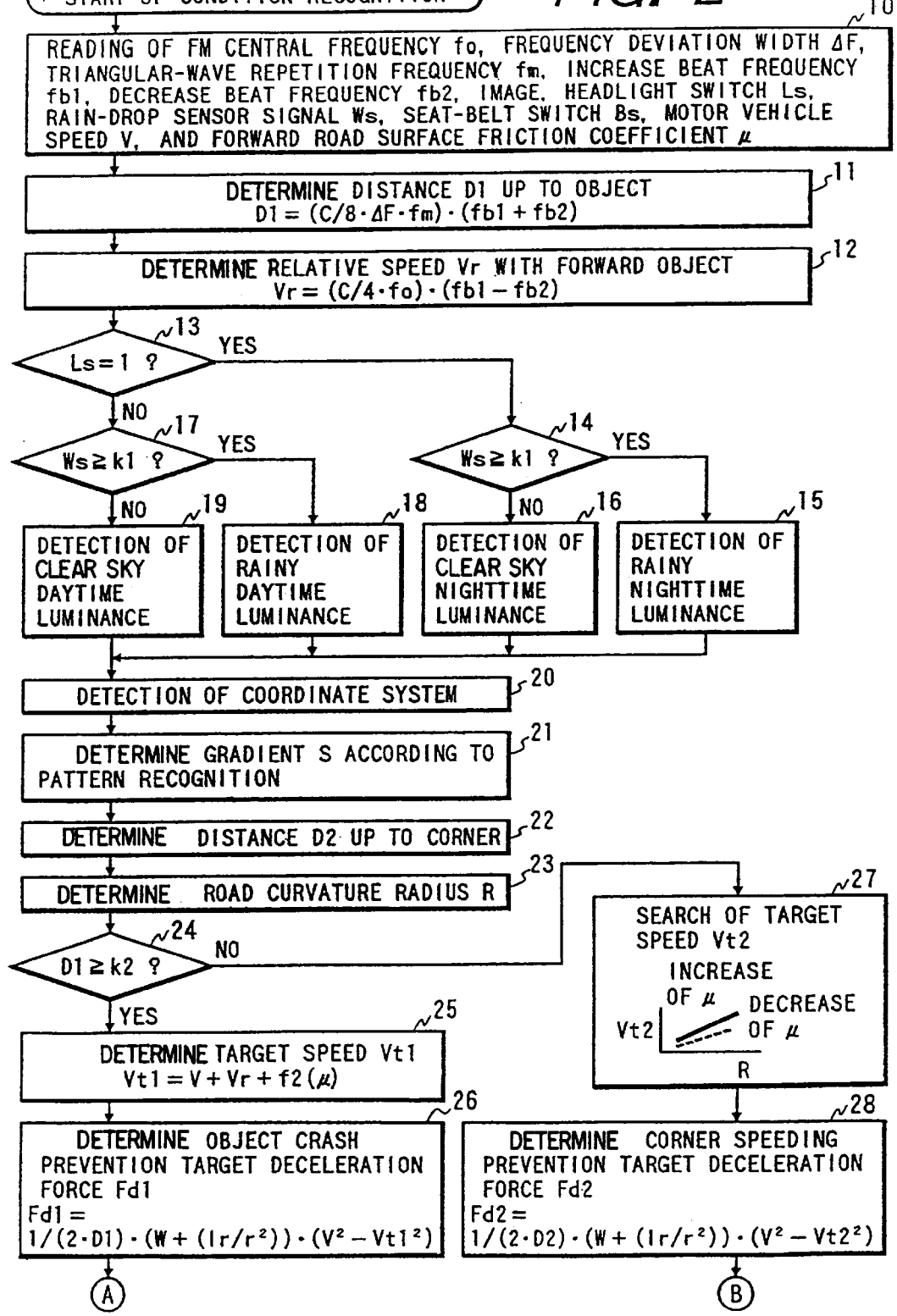
FIG. 2 is a flow chart of control by an embodiment of the present invention, showing the operation of the dangerous traveling decision unit.
Figure 3:
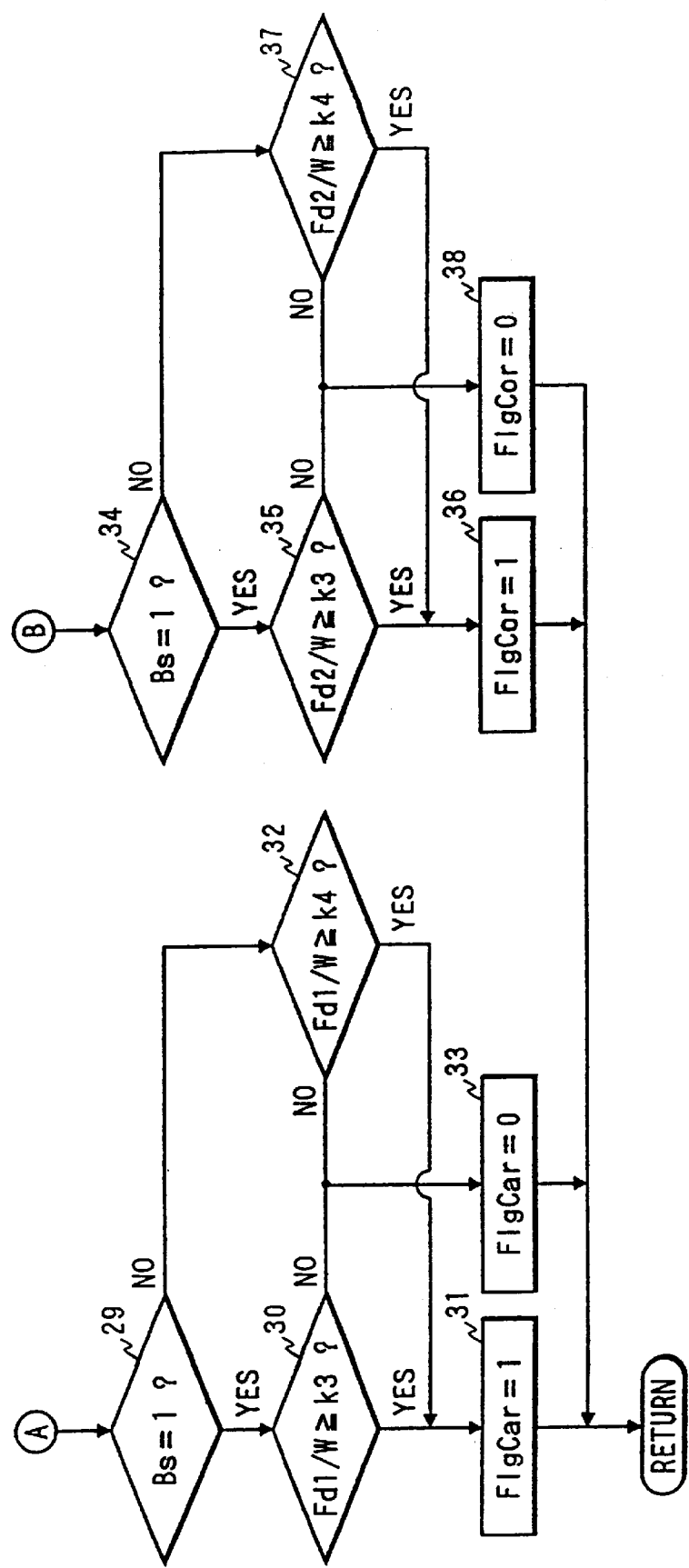
FIG. 3 is a flow chart of control by an embodiment of the present invention, showing a continuation of FIG. 2.
Figure 4:
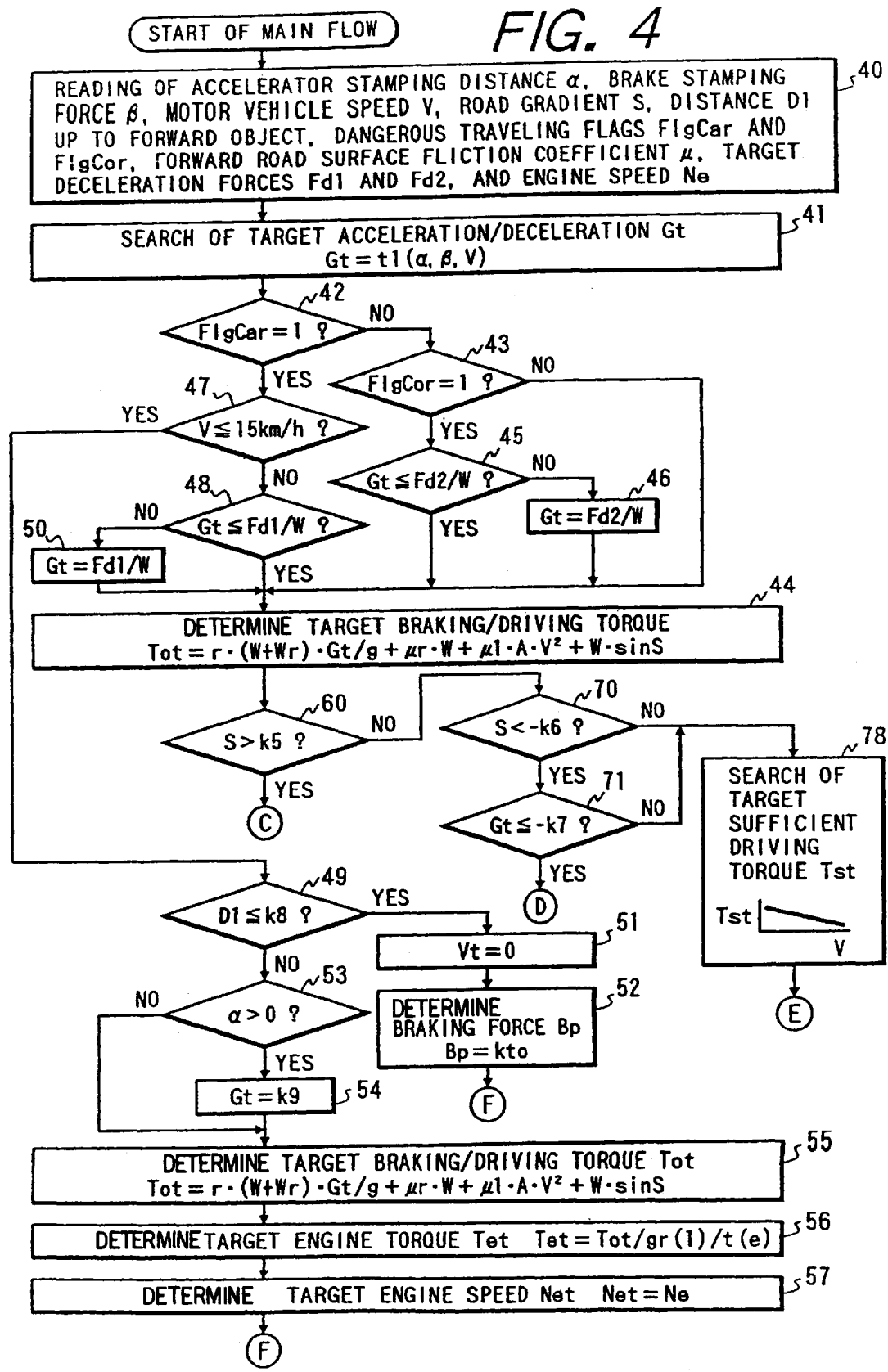
FIG. 4 is a flow chart of control by an embodiment of the present invention, showing processing control of an engine power train.

FIGS. 2 to 7 are flow charts which illustrate the control process performed by the embodiment of FIG. 1. FIGS. 2 and 3 in particular illustrate the operation of the dangerous traveling decision unit 5. (Various traveling conditions are simultaneously determined in accordance with these flows.) First, in step 10, the following values are read: an FM central frequency $f_0$, a frequency deviation width $\Delta F$, a triangular-wave repetition frequency $f_m$, an increase beat frequency $f_{b1}$, a decrease beat frequency $f_{b2}$, a television camera image, a headlight switch Ls, a rain-drop sensor signal Ws, a seat belt switch Bs, a motor vehicle speed V, and an approaching road surface friction coefficient $\mu$.

The quantities $f_0$, $\Delta F$, and $f_m$, are generally uniquely determined by the type of an FM-CW-system radar, using a frequency-modulated continuous wave signal. Therefore, it is possible to store the data for each type of radar in a memory. However, if that is done, then it is necessary to change data and control software whenever changing radars, thereby increasing the development man-hours. Therefore, it is preferable to use intelligent radar, which outputs the above signals ($f_0$, $\Delta F$, and $f_m$), and read the data as described above.

In step 11, the distance between the vehicle and an approaching object is determined by means of the FM-CW-system radar and the expression indicated in step 11. Moreover, in step 12, the relative speed Vr between the approaching object and the vehicle is determined using the radio-wave propagation velocity C of $3 \times 10^8$ m/sec (previously stored in a memory), and the expression shown in step 12. (The arithmetic expressions in steps 11 and 12 are well known.)

Steps 13 to 19 show a method for generating a television camera image corresponding to the weather and daytime or nighttime conditions. That is, the luminance of road images captured differ depending on the weather conditions and whether it is daytime or nighttime. Therefore, it is possible to execute road detection based on a luminance, and to obtain a more accurate road shape.

In step 13, it is determined whether the headlight switch Ls is turned on. When it is, (that is, Ls equals 1), nighttime is detected, and the process advances to step 14, in which it is decided whether the rain drop sensor signal Ws equals or exceeds a constant k1. The constant k1 relates to the fact that the road-surface luminance detected by a television camera varies depending on the amount of rain fall, which information is previously detected and stored in a memory. Therefore, in step 14 when Ws equals or exceeds k1, rainy/nighttime traveling is recognized, and in step 15 rainy/nighttime luminance detection and road-surface image processing is performed. In the case of NO in step 14, clear sky/nighttime traveling is recognized, and clear sky/nighttime luminance detection and road surface image processing are performed in step 16.

Step 17 corresponds to step 14. That is, if Ls=0 in step 13 (light switch off), it is determined to be daytime, and a determination is made in step 17 whether Ws equals or exceeds k1. If so, rainy/daytime traveling is recognized, and rainy/daytime luminance detection and road-surface image processing are performed in step 18. In the case of NO in step 17, clear sky/daytime traveling is recognized, and clear sky/daytime luminance detection and road-surface image processing are performed in step 19. Road state detection according to luminance detection is a well known art.

Figure 9:
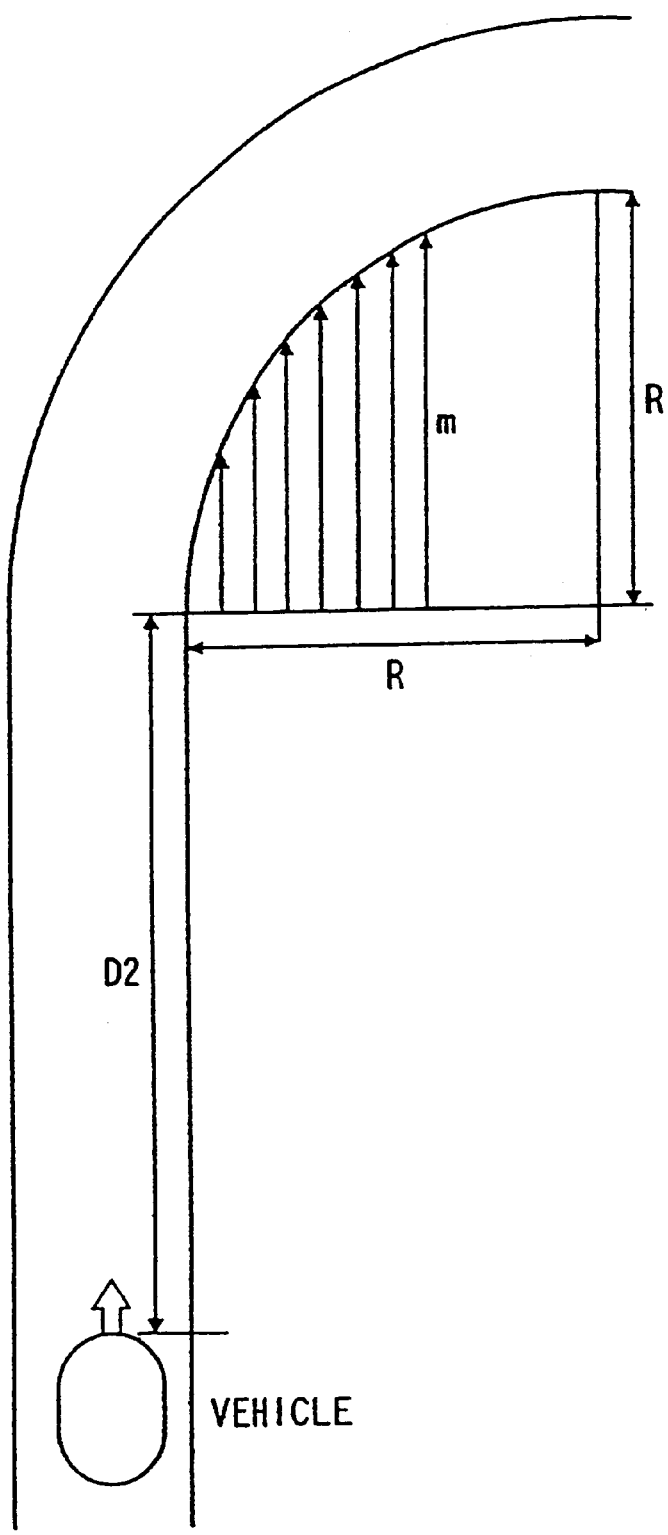
FIG. 9 is an illustration showing a curvature coordinate system of an actual road.
Figure 10:
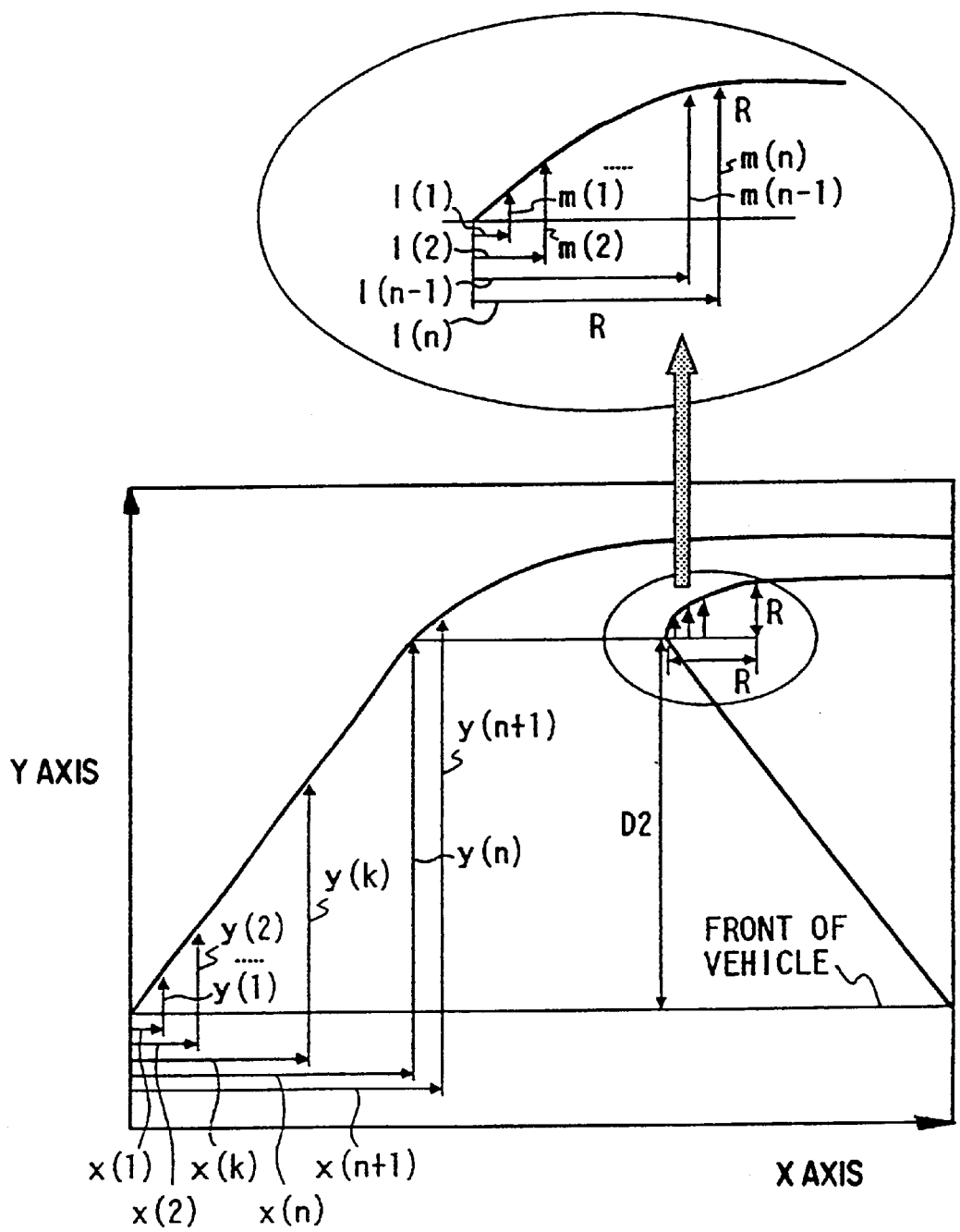
FIG. 10 shows an image of a road curvature coordinate system.

In step 20, the path followed by the forward-road in a coordinate system is determined as shown in FIG. 9, using the coordinates shown in FIGS. 9 and 10. (As indicated previously, this information is determined by the road condition detection unit 4 (FIG. 1) in a conventional manner, by means such as a camera, radar and navigation map information.) FIG. 9 shows an actual road curvature coordinate system, and FIG. 10 shows a perspective view of the road curvature coordinate system obtained by displaying FIG. 9 in an image of the road. The road coordinate information determined in step 20 is subsequently used in steps 22 and 23 below.

Figure 11:
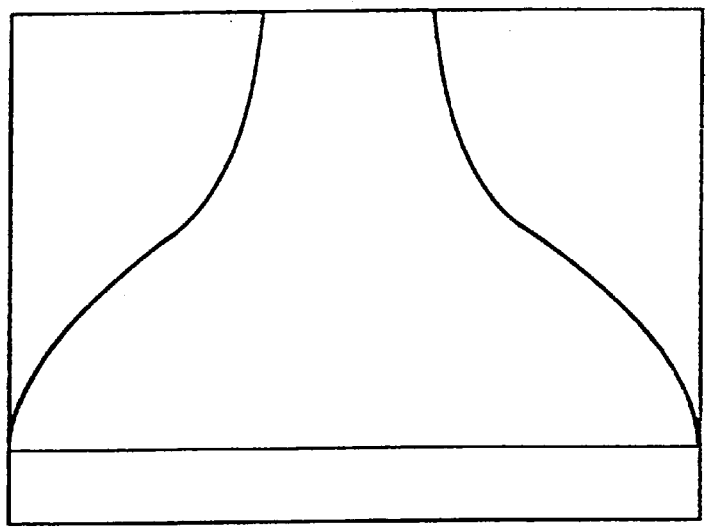
FIG. 11 is an example of a downward slope.
Figure 12:
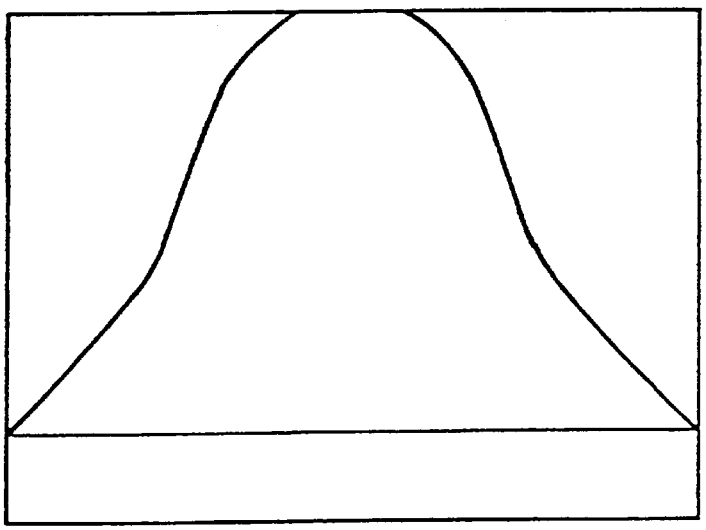
FIG. 12 is an example of an upward slope.
Figure 13:
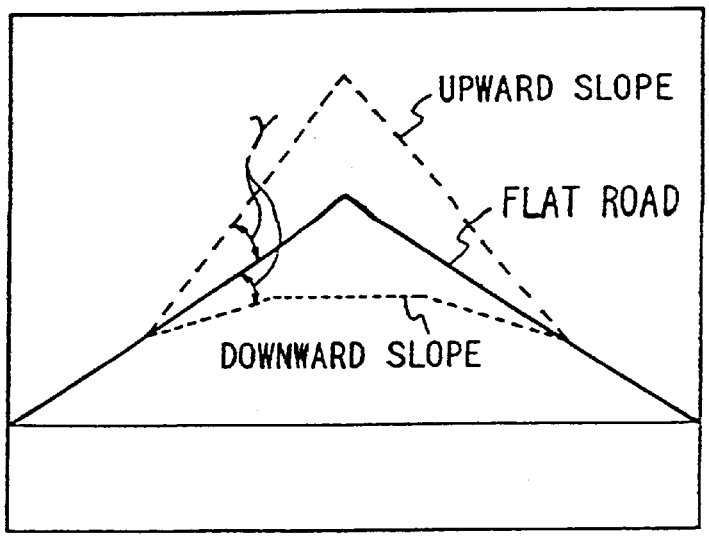
FIG. 13 shows a method for detecting a gradient of a forward road.

In step 21, the gradient S is detected by recognizing the curved lines at the right and left edges of the road as shown in FIGS. 11 and 12. For this purpose, a plurality of patterns showing a road shape are stored in a computer capable of performing the operation according to a neural network, and a forward road condition is determined by comparing the patterns with a detected road shape. FIG. 11 shows, for example, a downward-slope road shape, while FIG. 12 shows an upward-slope road shape. FIG. 13 shows a method for detecting a forward road gradient. An angle γ is detected between right and left edges of the road and the corresponding edges of a flat road shape using a television camera image, and this information is converted into the road gradient S.

When a corner is recognized together with a gradient, they are processed in step 22, 23. In step 22, a distance D2 to the corner is determined from the road path coordinates shown in FIG. 10, using the following expressions (1) and (2).

$$y(n+1)/x(n+1) < \{(y(1)/x(1) + \ldots + y(k)/x(k))/k\} \quad (1)$$

$$D2 = y(n) \quad (2)$$

The right side of the expression (1) is an averaged straight line obtained by adding the ratio of the Y axis value y(n) to the x axis value x(n) for a plurality of consecutive points along a linear road shown by a coordinate system, up to n=k (FIG. 10) and dividing the added value by the total k. This process is repeated for successive points along the road until the next ratio y(n+1)/x(n+1) is smaller than the right side of the expression. When this occurs, a value one before n+1 (that is, y(n)) is substituted for D2 as the distance to the entrance of the corner.

In step 23, the curvature radius R of the corner is obtained by using the coordinate system shown in FIG. 10 and the following expressions (3) and (4).

$$m(n) = 1(n) \quad (3)$$

$$R = 1(n) \quad (4)$$

In expression (3), it is decided whether X axis 1(n) of the corner road (FIG. 10) matches Y axis m(n). (A matched value represents the curvature radius which is obtained by substituting 1(n) or m(n) for R as shown by the expression (4).) In this case, the conversion of the distances along the X and Y axes as between a camera image and actual distance is performed by referring to previously stored correction values. Recognition of the above corner can be performed by the same method independently of the road gradient because the camera changes similarly to the motor vehicle body under the present traveling state that is, on upward, downward, and flat roads.

Next, in step 24, it is decided whether there is another motor vehicle or an object which interrupts traveling ahead. Symbol k2 is a constant kept within a range in which an FM-CW-system radar is capable of measuring a distance up to a forward object. That is, it is decided that traveling ahead is limited by an approaching object in the case of YES in step 24, and that such traveling is limited by a forward-corner in the case of NO in step 24. In the case of YES in step 24, processing advances to step 25 to determine a target motor vehicle speed Vt1 by using the relative speed Vr with respect to a forward object, a function $f_2$ of the road surface friction coefficient μ obtained from intra-information or the like, and the motor vehicle speed V. Then, in step 26, an object crash prevention target acceleration Fd1 is determined by using the expression shown in step 26. This expression is calculated as follows:

$$T_1 = W \cdot V^2/2 + Ir \cdot (V/r)^2/2 \quad (5)$$

$$T_2 = W \cdot Vt1^2/2 + Ir \cdot (Vt1/r)^2/2 \quad (6)$$

$$U(1-2) = T_1 - T_2 = (1/2) \cdot \{W + (Ir/r^2)\} \cdot (V^2 - Vt1^2) \quad (7)$$

$$Fd1 = U(1-2)/D \quad (8)$$

These expressions, the symbol W represents a motor vehicle weight, Ir represents an inertia moment of a wheel, and "r" represents a wheel radius.

The purpose of step 26 is to determine an acceleration to change the present speed V to the future target speed Vt1 in order to secure safe traveling. The kinetic energy $T_1$ of a motor vehicle at the initial speed V is shown by the express (5) and the kinetic energy $T_2$ of the motor vehicle at the target speed Vt1 is shown by the expression (6). A kinetic energy lost from the initial speed to the target speed $(T_1 - T_2)$ is equal to external work U (1–2) (expression (7)). Therefore, when assuming a distance D1 from the present vehicle location at the present speed V to a point requiring the target speed Vt1, it is necessary to apply a deceleration force Fd1 given by the expression (8) during traveling the distance D1. Thereby, FD1 is obtained.

In the case of a NO determination in step 24, indicating that traveling ahead. is limited by a curve, a target speed Vt2 corresponding to R obtained in step 23 is searched. The speed Vt2 increases as R increases. That is, it is possible safely to increase the target speed as the radius of curvature increases. Moreover, safe traveling also requires a decrease of Vt2 as "μ" obtained from the infra-information decreases. In step 28, the same techniques as in step 26 is executed to determine target deceleration force Fd2 to prevent excessive speed at a corner.

After steps 26 and 28, processing advances to steps 29 or 34 shown in FIG. 3, as appropriate. In step 29, it is decided whether the seat belt switch Bs is turned on, for the purpose of avoiding a dangerous condition by controlling vehicle deceleration to maintain a motor vehicle speed which depends on whether the driver is wearing a seat belt or not. If the determination is YES in step 29 (that is, when a driver wears a seat belt), it is then determined in step 30 whether the target deceleration Fd1/W (force/weight) is k3 or more. (The value k3 is a safety deceleration constant in which a driver does not have an uncomfortable or unsafe sensation when wearing a seat belt.) If the determination is YES in step 30 a dangerous traveling flag FlgCar is set to "1" (there is an object ahead) in step 31, warning that a driver will feel uncomfortable at the present speed and dangerous deceleration will occur. (Control operations, discussed later and shown in FIGS. 4 to 7, are executed by using the flag signal.) In the case of a NO determination in step 30, the dangerous traveling flag FlgCar is set to "0" in step 33.

In the case of a NO in step 29, a determination is made in steps 32 whether a safe deceleration can be obtained without an uncomfortable or unsafe sensation even when the driver does not wear a seat belt. In the answer is YES in step 32, step 31 is performed, and if NO, step 33 is performed, as described above. A value k4 is a safe deceleration constant in which a driver does not have an uncomfortable or unsafe feeling in wearing no seat belt.

Steps 34 to 38 are similar to the above steps 29–33. In this case, if it is decided before entering a corner that a driver will feel uncomfortable and a dangerous deceleration will occur when entering the corner, the flag FlgCor is set to "1".

It is possible to obtain the setting of the target speed Vt2 for the road curvature radius R of step 27 (above) from the following expression, which can be evaluated at any time:

$$Vt2 = k20 \cdot \sqrt{\mu \cdot R \cdot g} \qquad (9)$$

Where, g: Gravitational acceleration; and k20: Constant for correction of center of gravity of vehicle.

As for the value "$\mu$", for example, 0.8 represents a dry asphalt road, 0.5 represents a wet asphalt road, and 0.3 represents a snow-covered road. Therefore, it is necessary to store a target speed (that is, a corner traveling limit speed) for each value of "$\mu$" in a memory. Furthermore, the values of the constants are changed depending on the center-of-gravity position of a motor vehicle. Therefore, it is necessary to change a constant value for each type of motor vehicle. For example, a one-box car which is unstable because of high center-of-gravity position has a small value of k20.

Figure 7:
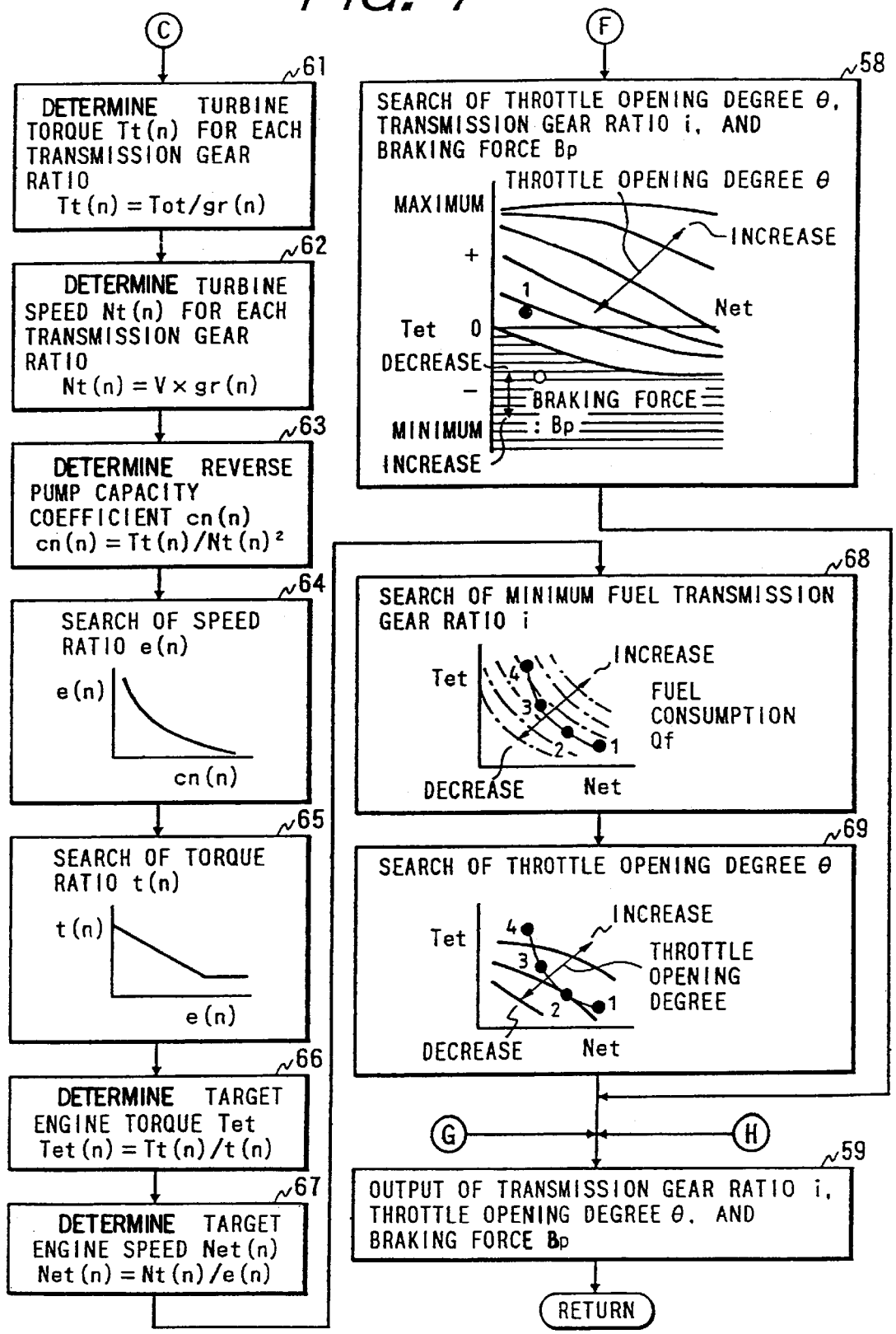
FIG. 7 is a flow chart of an embodiment of the present invention, showing a continuation of FIG. 4.
Figure 8:
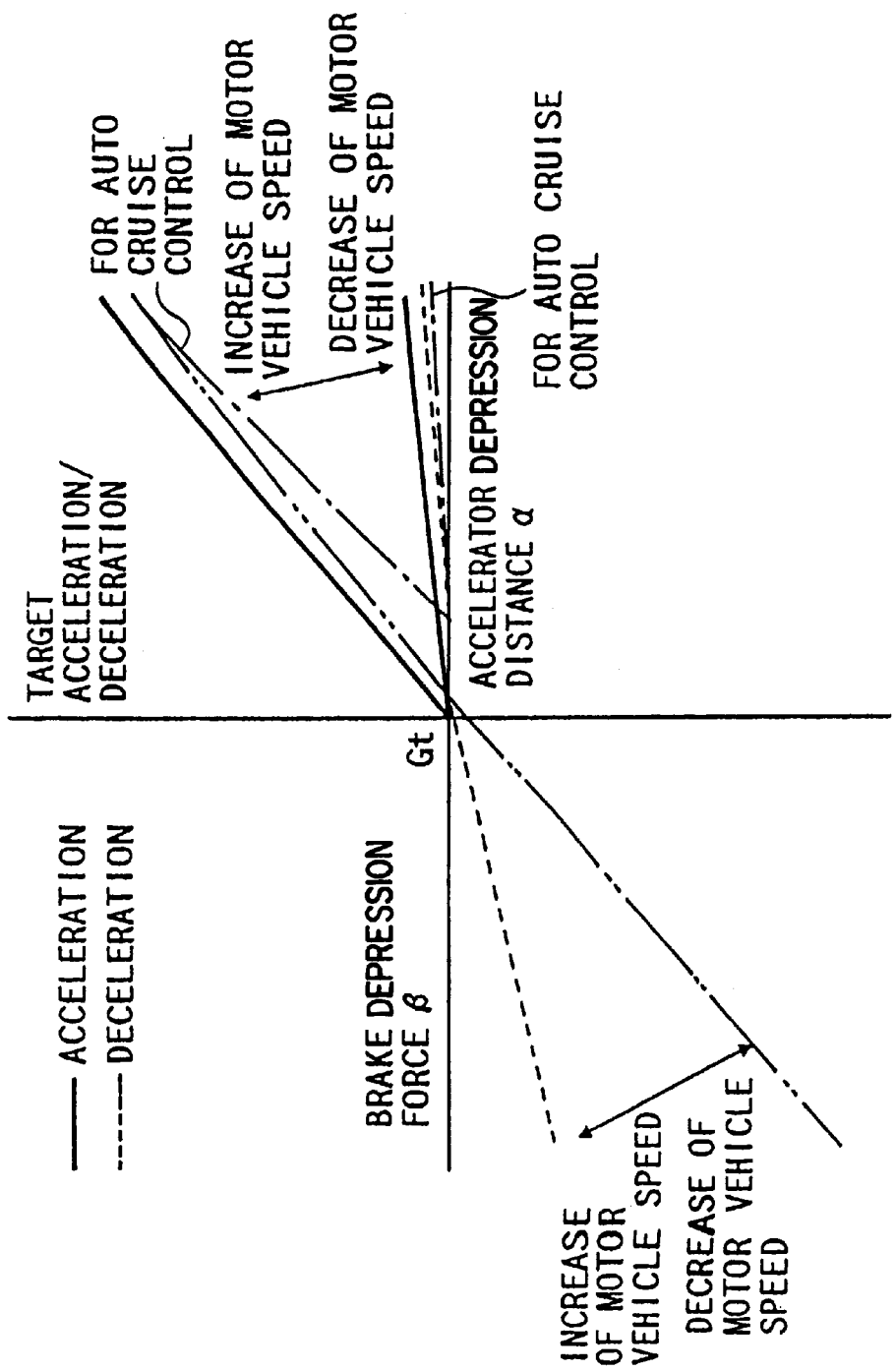
FIG. 8 is a conceptual view of a target acceleration table.

FIGS. 4 to 7 show a flow chart for engine power-train control according to the above traveling condition. In step 40 of FIG. 4, the following values are read: an accelerator depression distance $\alpha$, a brake depression distance $\beta$, a motor vehicle speed V, the forward road gradient S (obtained above), a distance D1 to approaching object, the values of dangerous traveling flags FlgCar and FlgCor, a forward road surface friction coefficient $\mu$, target deceleration forces Fd1 and Fd2, and an engine speed Ne. In step 41, the value of a target acceleration/deceleration Gt is determined as a function of $\alpha$ and $\beta$ set as shown in FIG. 8, which is a conceptual view of a target acceleration/deceleration table. In FIG. 8, the continuous line represents an acceleration (that is, a case in which the present read value becomes larger than the last acceleration depression distance, read one cycle before in the operation flow) and the broken line represents a deceleration, (the present read value becomes smaller than the last acceleration depression distance, read value one cycle before in the operation flow). Moreover, a plurality of the above values are set in accordance with various motor vehicle speeds as shown in FIG. 8. FIG. 8 shows only ranges. Furthermore, to keep the motor vehicle speed constant (auto cruise control), a target acceleration is set to 0 in an area where the acceleration depression distance is not 0, but is small, as shown by a one-dot chain line. Thereby, it is possible to maintain the present motor vehicle speed after acceleration.

In FIG. 8, both acceleration and deceleration are shown in one drawing. Actually, however, to a positive accelerator depression distance (right top area), and a negative accelerator depression distance (right bottom area), two tables are necessary for acceleration and deceleration. It is possible, however, to realize the acceleration and the deceleration in a single table in order to reduce the required memory capacity. However, the accelerator depression distance fluctuates slightly due to motor vehicle vibrations, even though a driver requests a constant acceleration. As a result, torque fluctuation may occur. Therefore, it is necessary to add a hysteresis effect.

In step 42, it is determined whether the dangerous traveling flag FlgCar (steps 31, 33 above) is set to 1. If not, it is decided in step 43 whether the dangerous traveling flag FlgCor (steps 36, 38 above) is set to 1. If the answer is NO in step 43, a target braking/driving torque Tot is determined in step 44, using the target deceleration Gt obtained in step 41 requested by a driver and the following express:

$$Tot = r \cdot (W+Wr) \cdot Gt/g + \mu r \cdot W + \mu l \cdot A \cdot V^2 + W \cdot \sin S \qquad (10)$$

Where, r: Wheel radius;

W: Motor vehicle weight;

Wt: Rotation equivalent weight;

g: Gravitational acceleration;

$\mu r$: Rolling resistance coefficient;

$\mu l$: Air resistance coefficient; and

A: Forward projection area.

In the right side of expression (10), the first term represents an acceleration torque necessary for motor vehicle acceleration, the second term represents a rolling resistance, the third term represent an air resistance, and the fourth term represents a grade resistance. In this case, Gt, V, and S are determined by the above described flow, and constants determined for each motor vehicle are previously set to variables other than Gt, V, and S. In the case of a YES determination in step 43, it is decided that there is a corner ahead and that deceleration is necessary. In step 45, it is then decided whether the target acceleration/deceleration Gt requested by the driver in step 41 is equal to or less than the target declaration Fd2/W decided from the present traveling condition. (See steps 35,37.) If so, the driver has made a correct decision relative to dangerous traveling in future and step 44 is started. In the case of a NO determination in step 45, because a correct decision has not been made, in step 46 the target acceleration/deceleration is set to the target deceleration Fd/2 determination from current traveling conditions in step 28, and step 44 is then started.

When a YES determination is made in step 42, processing advances to step 46, to decide whether the present motor vehicle speed V is, for example, 15 km/h or less. This is because, in the case of a low motor vehicle speed such as the time of a traffic jam or the time of parking a motor vehicle in a garage, a distance to a forward object must be controlled instead of controlling a target acceleration/deceleration. If the answer is NO in step 46, processing advances to step 48, to control the target acceleration/deceleration. On the other hand, if the answer is YES, step 49 is initiated to control a target distance.

Steps 48 and 50 correspond to steps 45 and 46 (but apply where the driver is wearing a seat belt). After these steps are performed, step 44 is initiated.

In step 49, it is determined whether the distance D1 to a forward object is equal to or less than a limit value k8 (for example, approx. 1 m which is the minimum distance to avoid a crash with the forward object). If so, (that is, just before crash), the target motor vehicle speed Vt is set to 0 in step 51, and in step 52, a constant k10 (at which a motor vehicle can stop at a low motor vehicle speed) is input to a target brake Bp.

In the case of a NO determination in step 49, it is determined in step 53 whether $\alpha$ is larger than 0. If it is, in step 54 a constant value k9 is input as the target acceleration/deceleration. The value k9 is a target acceleration value for safety first at a low motor vehicle speed, when an object is present ahead. Thereby, for example, even if a driver erroneously depresses the accelerator, safe traveling can be secured, because a motor vehicle travels at a constant acceleration. Moreover, though a constant acceleration is set in the above case, it is also possible to maximize the value k9 and adjust the maximized k9 to the target acceleration/deceleration Gt when the value k9 exceeds the maximum value.

Next, in step 55 the target braking/driving torque Tot is determined similarly to the determination in step 44. Then, in step 56, a target engine torque Tet is determined in accordance with the expression using a present transmission gear ratio (e.g. speed 1 in the case of 15 km/h or less), a torque ratio t(e) obtained from a torque converter speed ratio "e", and Tot (step 55). In step 57, a target engine speed Net to be used for a later step (to calculate a target throttle opening degree and a target braking force) is determined by assuming the Net equals a detected engine speed Ne.

Figure 5:
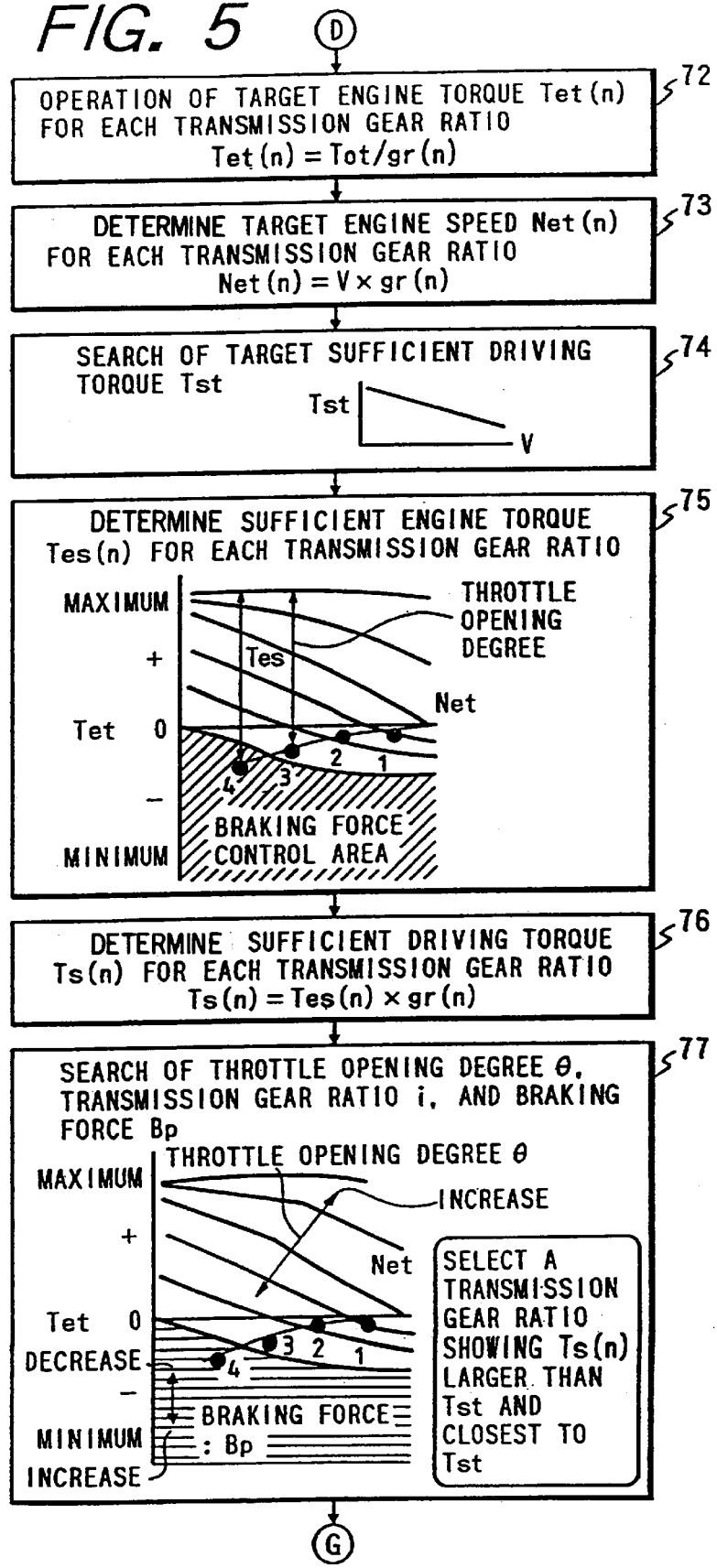
FIG. 5 is a flow chart of an embodiment of the present invention, showing a continuation of FIG. 4.
Figure 6:
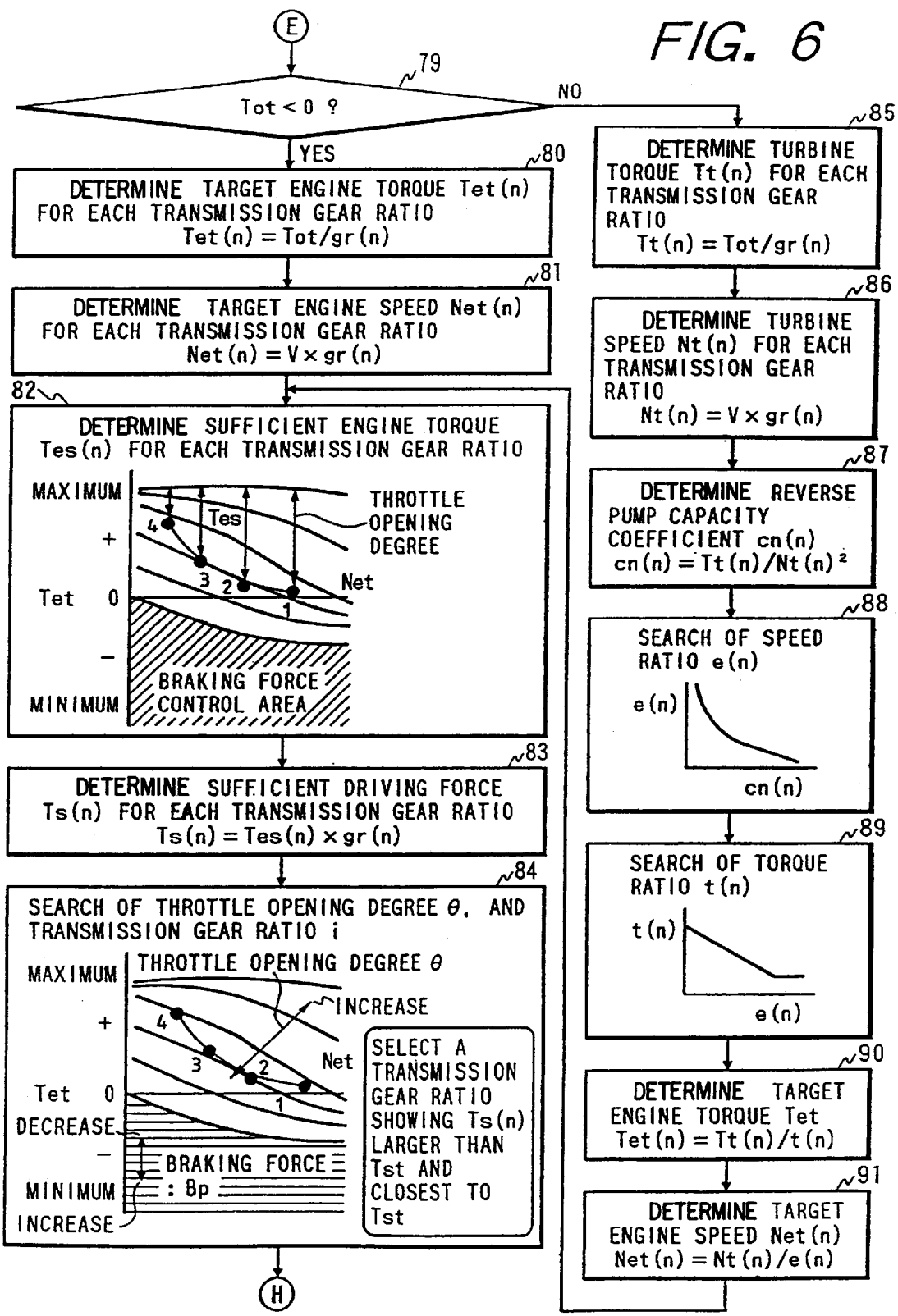
FIG. 6 is a flow chart of an embodiment of the present invention, showing a continuation of FIG. 4.

After step 52 or 57 (as applicable), step 58 shown in FIG. 5 searches a table of the target engine torque Tet corresponding to the target engine speed Net (X-axis) and obtains a target throttle opening degree θ, a target transmission gear ratio i, and the target braking force Bp. When starting from step 52, the target braking force Bp, shown by a white circle in step 58 in FIG. 7, is searched to obtain a target throttle opening degree θ=0 and a target transmission gear ratio i=speed 1, which are output in steps 59, above with Bp. When starting from step 57, a target throttle opening degree θ, shown by a black circle in FIG. 7, is searched to obtain a target braking force Bp=0 and a target. remission gear ratio i=1, followed by step 59.

Returning now to FIG. 4, after step 44 in which the target braking or driving torque is determined, it is further determined in step 60 whether the forward road gradient S obtained in FIG. 2 is larger than k5. (The value k5 is a constant for an upward slope gradient, which makes it possible to control a speed change point for reduction of fuel consumption in which a driver does not have an uncomfortable sensation even if a high motor vehicle speed is changed when a traveling load is relatively large.) In the case of a YES determination in step 60, fuel consumption speed change is executed, step 61 shown in FIG. 7 is executed, and a torque-converzer output shaft torque for each transmission gear ratio, a so-called turbine torque Tt(n) is determined. (The value "n" of Tt(n) depends on a transmission set to a motor vehicle, preferably 4 in the case of a four-speed transmission, and a controllable value such as 20 in the case of a non-stage transmission.) The torque Tt(n) is obtained by dividing the above Tot by "n" transmission gear ratios gr(n).

In step 62, a torque-converter output-shaft speed for each transmission gear ratio, that is, a turbine speed Nt(n), is determined. The speed Nt(n) is obtained by multiplying the above V by "n" transmission gear ratios. Thereafter, in step 63, a reverse pump capacity coefficient cn(n) for each transmission gear ratio is determined from Tt(n) and Nt(n) obtained in steps 61 and 62. Next, in step 64, a speed ratio e(n) for each transmission gear ratio is searched. In this case, the relation between cn(n) and e(n) can be obtained by the following expressions:

$$e = Nt/Ne \quad (11)$$

$$Tt = t \cdot c \cdot Ne^2 \quad (12)$$

$$cn(n) = (t \cdot c/e^2) = Tt/Nt^2 \quad (13)$$

where,
- e: Torque-converter input/output shaft speed ratio;
- Nt: Torque-converter output shaft speed;
- Ne: Engine speed;
- Tt: Torque-converter output shaft torque;
- t: Torque-converter torque ratio (Function of "e");
- c: Torque-converter pump capacity coefficient (Function of "e").

In step 65, a torque ration t(n) for each transmission gear ratio is obtained as a function of the speed ratio e(n), and in step 66, the target engine torque Tet is determined using the Tt(n) and t(n) obtained in steps 61 and 65. In step 67, the target engine speed Net is determined as a function of Nt(n) and e(n) obtained in steps 62 and 64. Moreover, in step 68, the speed change ratio "i" for minimum fuel consumption is obtained based on the value for transmission gear ratio obtained in steps 66 and 67. (In this case, it is shown that "n" is equal to 4 for a four-speed transmission.) In the case of fuel consumption comparison here, the power generated at the transmission output shaft is changed due to slip of the torque converter. Therefore, a table of fuel consumption is used which can detect torque converter efficiency and an engine efficiency at the same time. In step 69, a table of target throttle opening degree θ (to be set with the same shaft as that in step 68) is searched to obtain θ at the same position as that of the speed change ratio "i" obtained in step 68.

In the case of a NO determination in step 60 (FIG. 4), step 70 is carried out to determine whether the forward road gradient S is smaller than −k6. The value −k6 is a constant for a downward gradient. If the gradient is smaller than the value −k6, fuel is cut to reduce fuel consumption, only if the driver requests deceleration, which is determined in step 71 based on whether the target acceleration/deceleration Gt is equal to or less than the deceleration constant −k7. If it is, step 72 shown in FIG. 5 is executed to determine a target engine torque Tet for each transmission gear ratio based on Tot and gr(n). In this case, torque converter characteristics are not considered because the slip of a torque converter approaches zero, and the input/output shaft speed ratio of the torque converter approaches 1 in the case of deceleration. In step 73, the target engine speed Net is determined as a function of the above motor vehicle speed V and gr(n) similarly to step 72.

In the case of deceleration control, it is necessary to obtain an instantaneous sense of acceleration requested by a driver in acceleration after deceleration. Therefore, it is necessary to set a sufficient target driving torque Tst at the time of deceleration, which torque is determined in step 74 based on the motor vehicle speed V, which can be changed in accordance with the taste of the driver. For example, when V is small, Tst increases because a speed change ratio is set to the low side.

Next, in step 75, an engine torque Tes(n) sufficient for each transmission gear ratio is obtained from a table, based on Tet and Net. In step 76, a sufficient driving torque Ts(n) when changing speed change ratios under the present traveling state is determined from Tes(n) and gr(n) obtained in step 75. Finally in step 77, the results obtained in steps 74 and 76 are compared to obtain a target speed change ratio "i" where Ts(n) is larger than Tst, and closest to the Tst, a target throttle opening degree θ, and a target braking force Bp, which are output in step 59 (FIG. 7).

In the case of a NO determination in either of steps 70 and 71 (FIG. 4), a routine for flat road traveling including a corner and downward slope acceleration is preformed. In step 78, a sufficient target driving torque Tst requested by the driver is searched similarly to step 74 (FIG. 5). Thereafter in step 79 (FIG. 6) it is determined whether the above Tot is smaller than 0. If so, deceleration is determined and steps 80, 81, 82, 83, and 84 are executed an analogously to steps 72, 73, 75, 76, and 77 respectively. Thereafter, the variables thus determined are output in step 59.

When it is determined in step 79 that Tot is equal to or more than 0, (that is, NO is decided), a target engine torque Tet and engine speed Net considering torque converter characteristics are calculated. Steps 85, 86, 87, 88, 89, 90, and 91 execute the same determinations as in the above steps 61, 62, 63, 64, 65, 66, and 67 respectively, after which step 82 is commenced.

Figure 14:
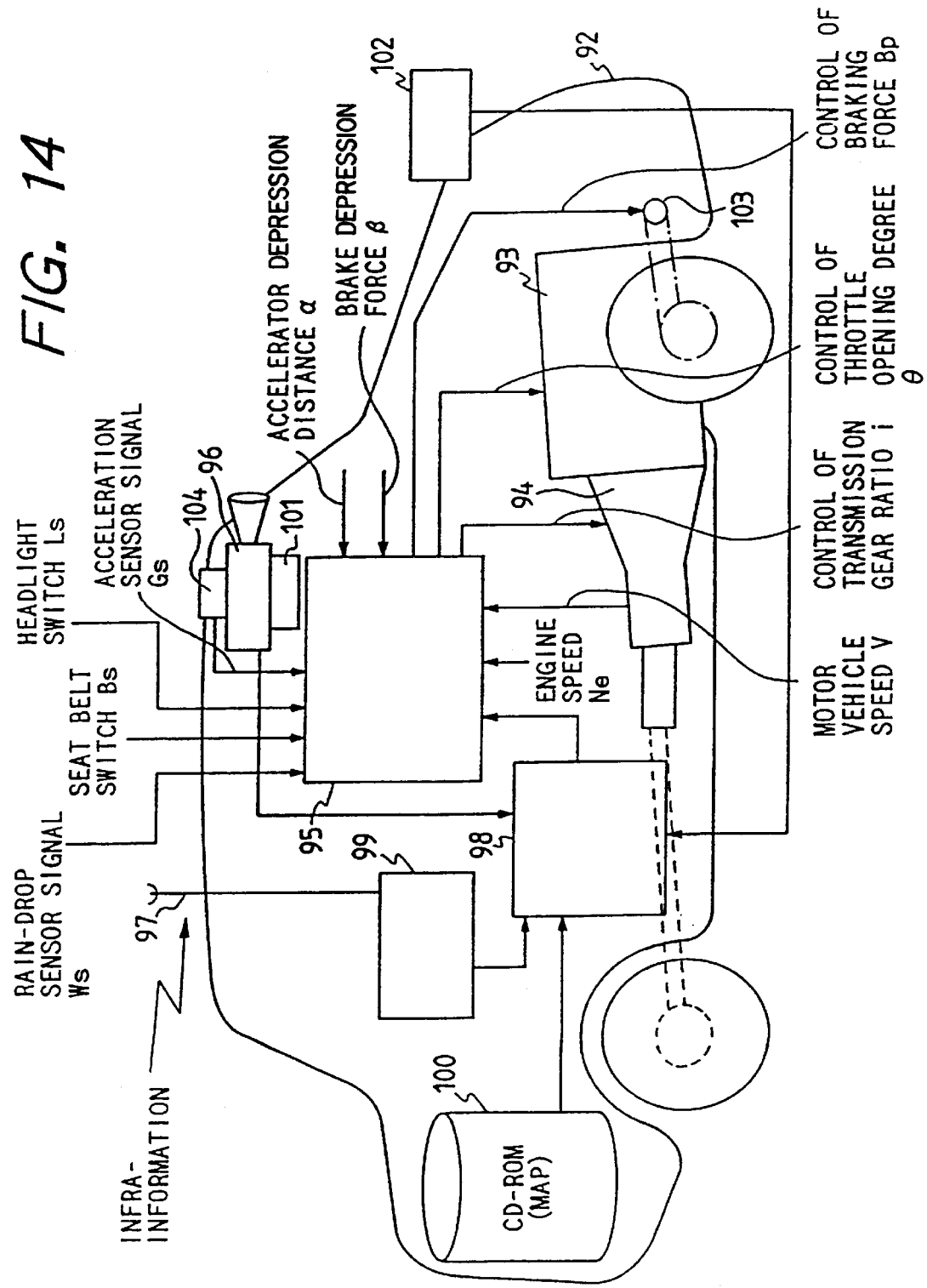
FIG. 14 is a block diagram of an embodiment of the present invention mounted on an actual motor vehicle.

FIG. 14 shows a schematic system block diagram of an embodiment of the present invention mounted on an actual motor vehicle. An engine 93 and a transmission 94 are mounted on a chassis 92, where throttle opening degree (or air flow rate) θ, fuel quantity, ignition timing, braking pressure, and transmission gear ratio are controlled in accordance with signals output form an engine power-train control unit 95. Fuel control uses the inlet-port injection system widely used at present or cylinder injection system with a high controllability. Moreover, a television camera 96 for detecting an outside state of an antenna 97 for detecting infra-information are mounted on the chassis 92. An image from the television camera 96 is input to a traveling condition discrimination unit 98 and processed to recognize a road gradient, corner curvature radius, traffic light information, and traffic sign.

An FM-CW-system radar 102 is set at the front of the chassis 92 to detect a distance to a forward motor vehicle or object and a relative speed. Furthermore, the antenna 97 connects with an infra-information terminal 99, a forward road state (wet road, dry road, or snow-covered road, or presence or absence of sand on a road) is detected in accordance with infra-information, and the traveling condition discrimination unit 98 determines a road-surface friction coefficient μ. Moreover, a traveling condition can be discriminated in accordance with map information stored in a CD-ROM 100 or the like and forward road states (e.g. gradient and corner curvature radius) can be detected. A signal corresponding to a traveling condition, a degree of risk on the traveling condition, and a road-surface friction coefficient μ are output from the traveling condition discrimination unit 98 and input to the engine power-train control unit 95. A throttle opening degree θ, fuel quantity, ignition timing, transmission gear ratio i, and braking force Bp by braking-pressure control actuator 103 are controlled in accordance with the signal. Moreover, an accelerator depression distance α, brake depression force β, motor vehicle speed V, engine speed Ne, raid drop signal Ws, seat belt switch Bs, and headlight switch Ls are input to the engine power-train control unit 95 and used for the control operations shown in FIGS. 2 to 7. Furthermore, an acceleration sensor 104 for detecting, for example, a vertical acceleration is mounted on the television camera 96 and an actuator 101 for restraining and controlling vibrations is mounted on the bottom of the television camera 96 to feedback-control a signal output from the acceleration sensor 104 and prevent the detection accuracy of the television camera 96 from deteriorating due to oscillation of the camera.

FIG. 15 is a control flow chart for restraint of vibrations of the television camera 96. First, a signal Gs output from the acceleration sensor 104 is read in step 110, and is integrated to determine a motor vehicle fluctuation speed Vtd in step 111. In step 112, the Vtd is integrated to determine a vertical fluctuation position (that is, a stroke) Std of the motor vehicle. Then, in step 113, it is decided whether the Std equals a constant k15 representing a constant television-camera image detection angle. When the Std equals the constant k15 in step 113, the last driving signal $As_{(n-1)}$ is substituted for a control signal $As_{(n)}$ (step 114) for driving the actuator 101 which controls a television-camera angle. Thereafter, in step 115, the present driving signal $As_{(n)}$ is substituted for the last driving signal $As_{(n-1)}$ and the process returns. In the case of a No determination in step 113 (that is, when Std is not equal to the constant k15), step 116 is executed to obtain a deviation ΔS between the Std and the constant k15. In step 117, a value obtained by adding a PID control value of the ΔS to the last driving signal $As_{(n-1)}$ for the $As_{(n)}$ and then, step 115 is executed. Thus, it is possible to restrain detection errors of a road gradient and road curvature radius due to oscillation of a television camera and accurately control a power train. Moreover, it is possible to use a suspension control sensor used for chassis vibration restraint as the acceleration sensor 104 in order to reduce costs.

As described above, the present invention has an advantage that fuel economy, operability, and safety can be improved because an actual acceleration/deceleration can be controlled to an acceleration/deceleration requested by a driver at the time of traveling under a safe condition.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for a power train of a motor vehicle comprising:

a pattern memory in which data of road environment patterns is stored;

a road environment detector for detecting road environment data in front of said motor vehicle;

a pattern converter unit for converting said road environment data to a road environment pattern;

a pattern comparing unit wherein one of said road environment patterns is selected by matching said converted environment pattern and said data of road environment patterns; and a controlling unit wherein at least one of an engine, a transmission, and brake is controlled based on said selected road environment pattern.

2. A control apparatus for a power train of a motor vehicle according to claim 1, wherein:

at least one of said pattern converter unit and said pattern comparing unit is a computer capable of performing an operation according to a neural network.

3. A control apparatus for a power train of a motor vehicle according to claim 1, wherein said road environment is a shape of a road.

4. A control method for a power train of a motor vehicle comprising the steps of:

storing data of road environment patterns in a pattern memory;

detecting road environment data in front of said motor vehicle;

converting said road environment data to a road environment pattern;

selecting a road environment pattern by matching said converted environment pattern and data of road environment patterns in said pattern memory; and controlling at least one of an engine, a transmission, and brake based on said selected road environment pattern.

5. A control method for a power train of a motor vehicle according to claim 4, wherein:

at least one of said steps of converting said road environment data to a road environment pattern and selecting a road environment pattern is performed by means of a neural network.

6. A control method for a power train of a motor vehicle according to claim 4, wherein said road environment is a shape of a road.

* * * * *